UNITED STATES PATENT OFFICE.

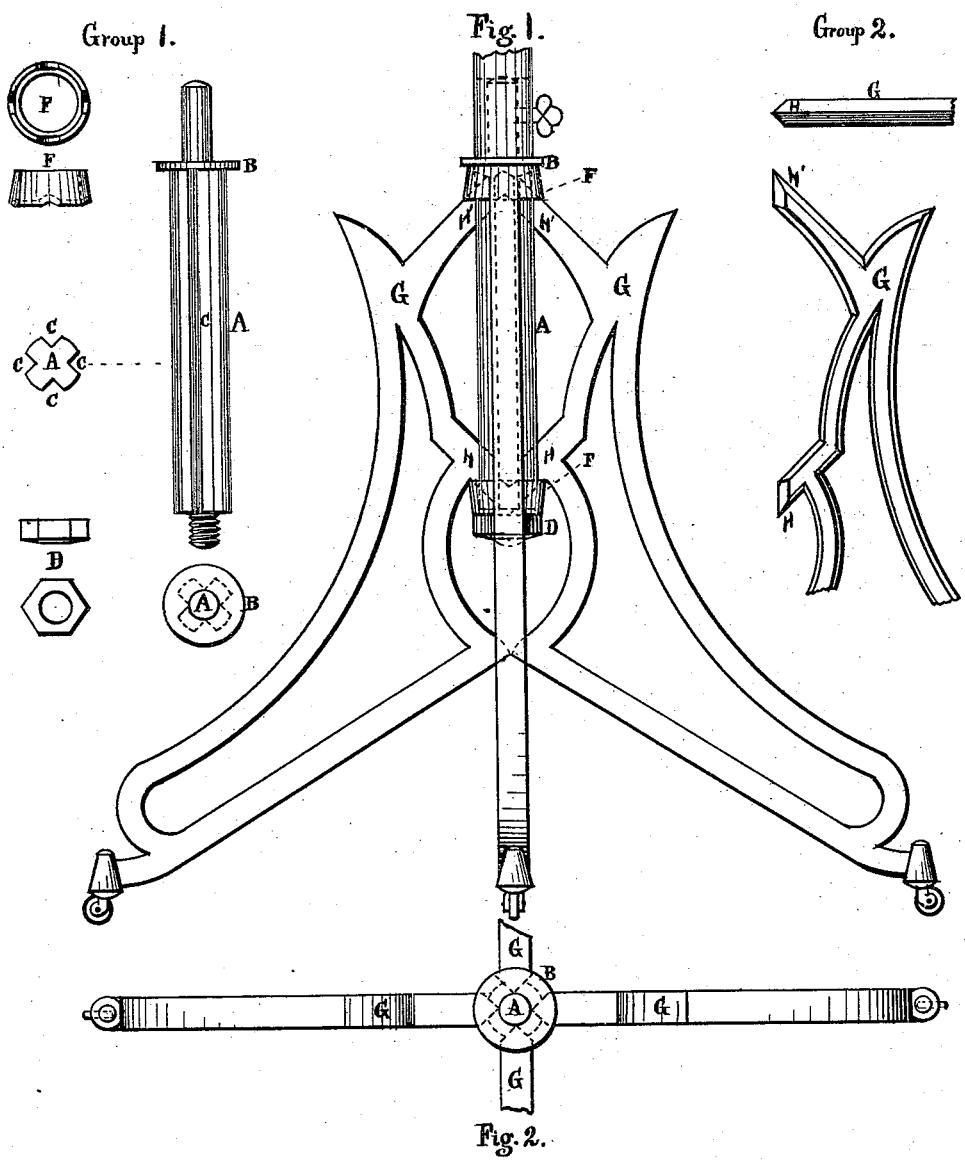

GEORGE R. OSBORN, OF EAST ORANGE, NEW JERSEY, AND BENJAMIN A. DRAYTON, OF NEW YORK, N. Y.

IMPROVEMENT IN IRON TABLE-STANDS.

Specification forming part of Letters Patent No. 187,300, dated February 13, 1877; application filed January 12, 1877.

*To all whom it may concern:*

Be it known that we, GEORGE R. OSBORN, of East Orange, county of Essex, State of New Jersey, and BENJAMIN A. DRAYTON, of the city and State of New York, have jointly invented certain Improvements in Iron Table-Stands, of which the following is a specification:

The nature and object of our invention is economically to strengthen, improve the appearance, and enhance the symmetry of the article known in the iron-trade as "table-stands," by a change in their mechanical construction.

The method long in use of construction has been the feet cast in one piece, forked into three or four "claws." In the center of this compound foot the upright shaft, plain or ornamental, has been secured by bolt and nut, or the lower end of the shaft threaded and screwed into a corresponding socket in the center of the foot.

We, in our method, cast the feet as so many separate pieces, and by a simple arrangement join these feet to the center shaft, and thus, as will hereinafter be shown, gain certain advantages in appearance and strength.

Figure 1 shows a front elevation in outline of the feet, and that portion of the shaft to which the feet are attached, with auxiliary pieces, rings, and nuts; Fig. 2, the same, top view.

Group 1, separate parts of the center shaft, side and section views; one of the rings or bands and nut. Group 2, side and top view of a portion of one of the feet.

Like letters indicate like parts.

A, center shaft, with collar B and longitudinal grooves C from the collar downward. The upper end is reduced in size, forming a shank for convenience in attaching a continuation of the shaft to the requisite height. In this order of arrangement the shaft might be continued as one piece. In case of a reverse order of the bolt—*i. e.*, the nut on the upper end of this section of shaft, with an ornamentally-turned head at the lower end as a fancy drop—the arrangement for continuing, as herein shown, would be preferable. The lower end of the shaft is reduced in size; a screw-thread cut on it to fit nut D. F F, two rings or bands, each with inwardly-beveling V-notches cut in one edge. G, foot, four of which are here used. Any number may be used.

The points H' H are shown beveled and V form in group 2.

The following, describing the assembling, will also explain the uses of parts: Inverting the shaft A, resting the shank on a surface, slip one of the rings D on the shaft to the collar B, the notches in the ring up and corresponding with the longitudinal grooves in the shaft. Place successively in upright position the feet G, the points H' resting in the grooves C and notches in the ring F. Slip the other ring on the shaft to cover points H in feet, and secure by nut D.

The advantages we claim are, first, increased strength, by bracing the shaft at a high point, a long shaft being weak; second, symmetry, through evidence of strength shown in the general construction and relief of the stand as a whole from a long shaft.

We do not claim table-stands as a new article of manufacture, nor as new the simple fact of casting the feet in separate pieces, nor the use simply of bolt and nut for securing material intervening head and nut of bolt.

We claim as new and of our invention—

1. A grooved or notched shaft and notched undercut bands and nut, in combination with the separate feet, with projecting points inserted and secured between said bands, substantially as and for the purposes shown and described.

2. The locking device shown, consisting of the combination of the undercut notched bands and shaft, adapted to engage with the projecting points on the feet, the whole secured by the nut, substantially as shown and described.

GEORGE R. OSBORN.
BENJ. A. DRAYTON.

Witnesses:
HARRY W. LAWRENCE,
E. J. B. GUNNING.